Nov. 6, 1928.

H. G. HARTE 1,690,369

ANIMAL TRAP

Filed Nov. 3, 1927

Inventor
H. G. HARTE
By Hiram A. Sturges
Attorney

Patented Nov. 6, 1928.

1,690,369

UNITED STATES PATENT OFFICE.

HENRY G. HARTE, OF OMAHA, NEBRASKA.

ANIMAL TRAP.

Application filed November 3, 1927. Serial No. 230,803.

This invention relates to an improvement in animal traps and more particularly to a trap for killing mice.

One object of the invention is to provide a storage compartment for bait, the construction to be of such arrangement that the bait cannot be consumed or disturbed, and therefore dispensing with the work frequently required of baiting the trap. Another object is to provide a storage place for bait remote from the jaws and operating parts of the trap so that the latter may be kept in a sanitary condition.

Another object is to provide a trap consisting of few and simple parts so that it may be manufactured at a limited expense.

The invention includes a trap which may be constructed entirely of metal so that it may be fumigated without injury, and includes a box or housing which, if desired, may be constructed of a single metallic sheet suitably incised and bent, and resulting in cheapness in production.

With the foregoing objects in view, and others to be mentioned hereinafter, the invention presents a new and useful construction, combination and arrangement of parts as described herein and claimed, and as illustrated in the accompanying drawing, it being understood that change in form, size, proportion of parts and minor details may be made, as found to be of advantage, said changes being determined by the scope of the invention as claimed.

Figure 1:
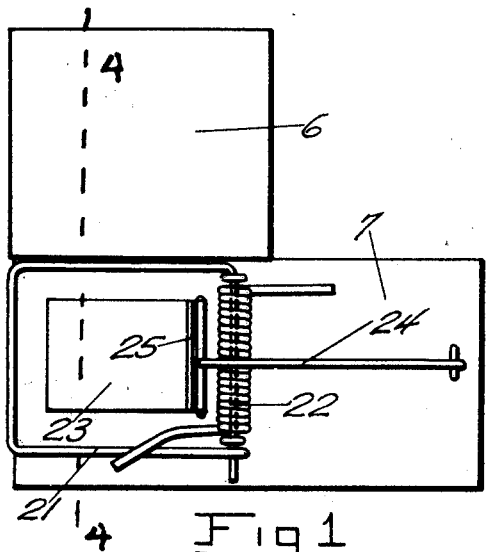
Figure 2:
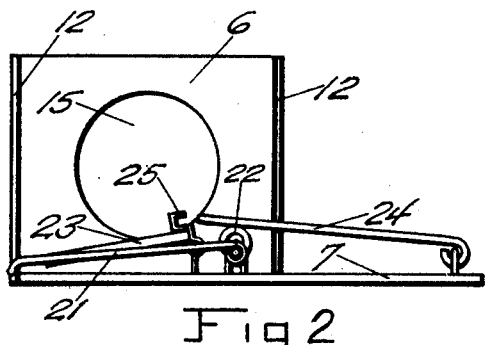
Figure 4:
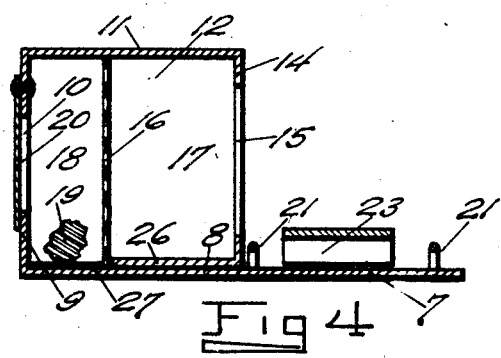
Figure 3:
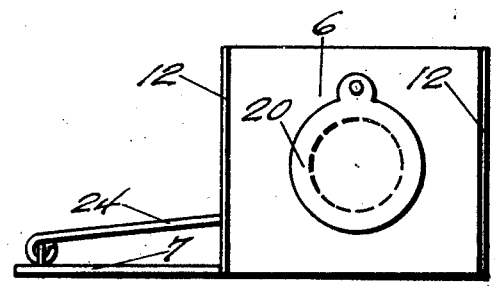
Figure 5:
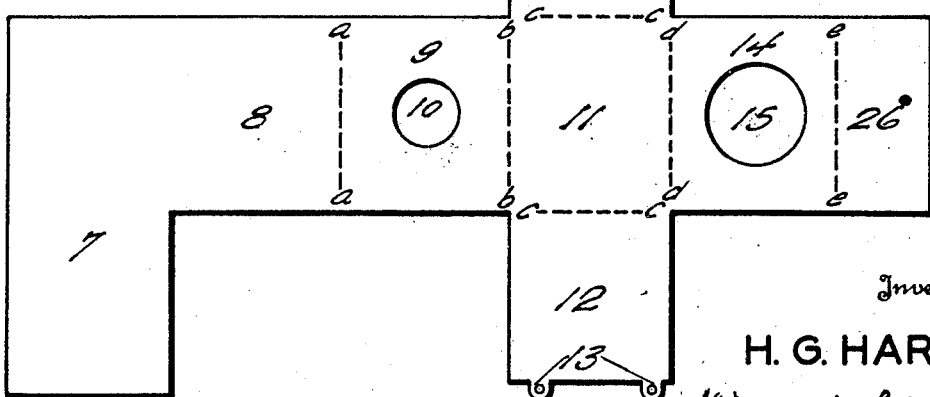

In the drawing, Fig. 1 is a plan view of the trap embodying my invention. Fig. 2 is a front view of the same. Fig. 3 is a rear view of the trap. Fig. 4 is a sectional view through the trap on line 4—4 of Fig. 1. Fig. 5 is a diagrammatic view, showing a metallic sheet incised and adapted to be bent to form a body or box and its platform for the trap.

Referring now to the drawing for a more particular description, I provide a hollow body or box 6, rectangular in plan having a platform 7 projecting forwardly therefrom in line with its bottom 8, its back 9 being provided with an opening 10 its top 11 being provided with rectangular wings 12 and which, when bent to a right-angle from the top 11 provides the ends of the box. These wings are provided, preferably, with projections 13 which are bent and which engage the lower surface of the bottom 8 as a substitute for soldering. The front of the box is indicated at 14 and it is provided with an entrance aperture 15.

Numeral 16 indicates a foraminous partition which is disposed upright in the box between the apertures 10 and 15, and therefore a compartment 17 is provided in communication with the entrance aperture 15 and a compartment 18 is provided in which bait 19 may be deposited. Numeral 20 indicates a door for closing the opening 10.

It will thus be seen that the entrance aperture 15 is disposed adjacent to and slightly above the platform 7, and that a mouse, in order to reach this aperture or compartment 17 must first move upon the platform. Also it will be noted that the odor of the bait may attract or lure mice so that they may approach the entrance way 15 since the partition is foraminous, but since the bait is not accessible it cannot be consumed or disturbed.

Any suitable device may be employed for trapping or killing the mice, said device to be mounted upon the platform. For this purpose I have shown and prefer to use parts of ordinary and well known construction, consisting of an impinging jaw 21 actuated by a spring 22 which is secured to the platform, a trigger-plate 23 pivotally mounted on the platform, and a control-bar 24 mounted to permit swinging movement from said platform, the jaw, preferably of U-shape, being adapted to be extended against the force of the spring and to lie upon or near the platform and to be maintained remote from the entrance 15 by the control-bar 24 while the latter engages the catch 25 of the trigger-plate, said bar, however, being released from the catch when said trigger-plate is depressed by a mouse while approaching the entrance 15, said release permitting the jaw to swing downwardly, by force of the spring, upon the platform in a well known manner, said jaw moving in an arc closely adjacent to the front wall and entrance of the box.

While I have shown the box and platform to be constructed of metal, and prefer sheet-metal, any suitable material may be used. If sheet-metal is used, the front wall 14 of the box is preferably provided with a foot-piece 26 adapted to be seated upon the bottom 8 of the box, and the foraminous partition 16 is of L-shape in cross-section and thereby provides a foot-piece 27, and since the latter engages the back or rear wall 9, it will be maintained in stationary relation with the box and the front wall will not be pressed inwardly of the box.

It will be seen that the box and platform may be constructed of a single piece of sheet-metal incised to provide the form in plan, approximately, as shown in Fig. 5 of the drawing, said plate providing the platform 7 and bottom 8, and bent upwardly on the dotted line $a$—$a$ at right-angles to the bottom to provide the back 9, and bent on the line $b$—$b$ at right-angles to the back to provide the top 10, the latter being bent downwardly from the top on lines $c$—$c$ to provide the ends 12 of the box, and bent downwardly on line $d$—$d$ to provide the front wall 14 and bent on the dotted line $e$—$e$ to provide the foot-piece 26.

I claim as my invention:—

1. In an animal trap, a box having an entrance aperture in its front wall and a platform projecting forwardly from its bottom below said aperture, a foraminous partition providing a compartment communicating with said entrance aperture and providing a second compartment for containing bait, and impaling devices mounted on the platform, one of the walls of said box having an opening communicating with the second compartment, and a closure-member for said opening.

2. In an animal trap, a metallic-sheet incised to provide a bottom for a box and a platform disposed in line with said bottom and bent at right-angles from its bottom to provide a back wall with an opening therein, and bent from its back parallel with its bottom to provide a top and a pair of wings, and bent at the junction of its top and wings at right-angles to said top to provide the opposed ends of the box, and bent into engagement with the platform at right-angles from its top to provide a front wall with an entrance aperture therein, a closure-member for the opening in said back wall, a foraminous partition in the box between its front wall and back wall, and impaling devices on said platform.

3. In an animal trap, a metallic-sheet incised and bent to provide a rectangular box having a flat bottom, a platform extending forwardly of said bottom, a rear wall having an opening therein, a front wall provided with an entrance aperture adjacent to the platform and a foot-piece projecting inwardly of the box in engagement with said bottom, trapping devices on said platform, and a foraminous partition in the box in engagement with the foot-piece of said front wall and having a foot-piece for engaging said rear wall, said partition providing a compartment communicating with the entrance aperture and a second compartment for containing bait.

4. In an animal trap, a metallic-sheet incised and bent to provide a flat bottom and a platform disposed in line with said bottom and bent upwardly from said bottom to provide a back wall having an opening therein, and bent from said back wall to form a top and a pair of wings, and bent from its top to provide a front wall for engaging said platform, and provided with an entrance aperture and bent from its front wall to provide a foot-piece for engaging said bottom, said wings at their junction with said top being bent downwardly to provide the opposed ends for said box, trapping devices on said platform, a closure-member for the opening of said back wall, and a foraminous partition in the box in engagement with the foot-piece of said front wall and having a foot-piece for engaging said rear wall, said partition providing a compartment for containing bait and providing a compartment in communication with the entrance aperture of said front wall.

In testimony whereof, I have affixed my signature.

HENRY G. HARTE.